United States Patent [19]
Mitani et al.

[11] Patent Number: 6,042,371
[45] Date of Patent: *Mar. 28, 2000

[54] COMBUSTION APPARATUS

[75] Inventors: Kazuhisa Mitani; Yusei Kusaka, both of Toyota; Yukio Fukuta, Yokkaichi; Tomohiko Nishiyama, Toyota, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/897,031

[22] Filed: Jul. 18, 1997

[30] Foreign Application Priority Data

Jul. 18, 1996 [JP] Japan .................................. 8-189097

[51] Int. Cl.⁷ ...................................................... F27D 17/00
[52] U.S. Cl. ............................................ 432/179; 431/215
[58] Field of Search ..................................... 432/179, 180, 432/181; 431/173, 215; 126/91 A; 236/15 BE

[56] References Cited

U.S. PATENT DOCUMENTS 5,628,629  5/1997  Mitani et al. ............................ 432/180

FOREIGN PATENT DOCUMENTS

6-221545  8/1994  Japan .
8-114388  5/1996  Japan .

*Primary Examiner*—John A. Jeffery
*Assistant Examiner*—Gregory A. Wilson
*Attorney, Agent, or Firm*—Pillsbury Madison & Sutro LLP

[57] ABSTRACT

A combustion apparatus includes a combustion chamber and a single-type regenerative combustion burner. The burner is arranged with respect to the combustion chamber so that a direction in which burnt gas returns to the burner is not opposed to a direction in which fuel and supply air are expelled from the burner. This combustion apparatus is applicable to various types of industrial furnaces including various types of boilers, for example, a crucible-type furnace.

21 Claims, 7 Drawing Sheets

COMBUSTION APPARATUS

This application is based on Japanese Patent Application HEI 8-189097 filed on Jul. 18, 1996, the content of which is incorporated into the present application by reference.

BACKGROUND OF THE INVENTION

1. Field of the Invention

The present invention relates to a combustion apparatus. More particularly, the present invention relates to a combustion apparatus which includes various types of industrial furnaces and boilers that have a regenerative combustion burner.

2. Description of Related Art

A single-type regenerative combustion burner is known in the art. In a single-type regenerative combustion burner, fuel and supply air are expelled into a furnace through the regenerative combustion burner and react with each other to generate burnt gas which circulates in the furnace to the regenerative combustion burner and is exhausted through the regenerative combustion burner to the atmosphere. The regenerative combustion burner has a heat storage member which retrieves and stores the heat of the burnt gas when the burnt gas passes through the heat storage member and releases the heat to the supply air when the supply air passes through the heat storage member, thereby pre-heating the supply air.

Figure 22:
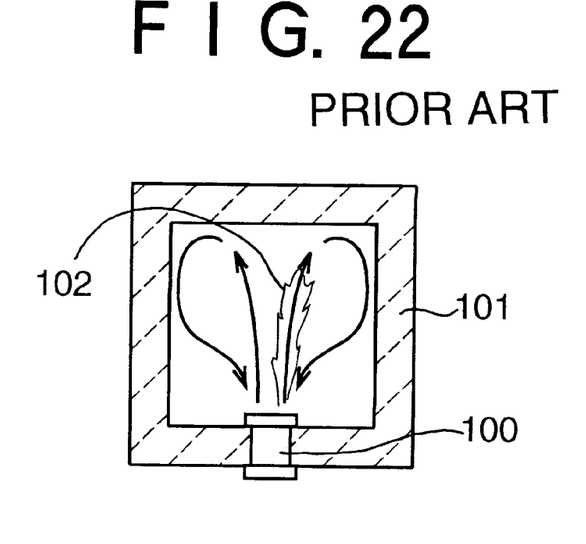
FIG. 22 is a schematic cross-sectional view of a conventional combustion apparatus.

There are two methods to mount the single-type regenerative combustion burner to a furnace:

One is a method illustrated in FIG. 22, wherein fuel and supply air expelled from the burner 100 flow toward the center of the furnace 101 so that the flame 102 directly hits the workpiece disposed at the center of the furnace.

Figure 23:
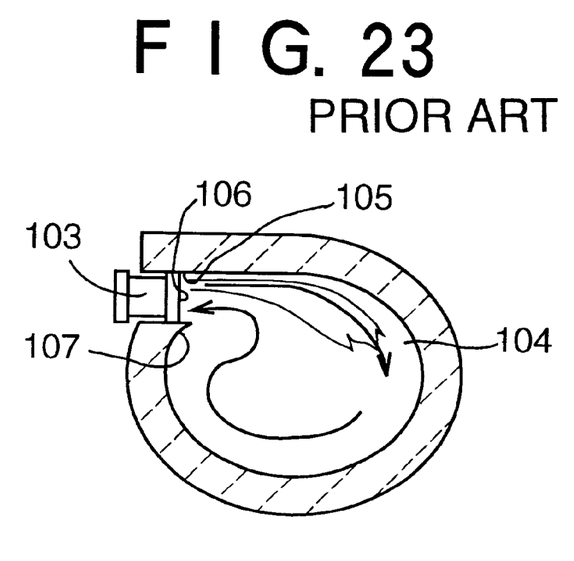
FIG. 23 is a schematic cross-sectional view of another conventional combustion apparatus.

The other is a method illustrated in FIG. 23 (and disclosed in Japanese Patent Publication HEI 8-114388), wherein the direction in which fuel and supply air are expelled from the regenerative combustion burner 103 is directed such that it is tangential to the combustion chamber 104. The burner is disposed in a concave region 105 receding from the configuration of the combustion chamber so that the tip end surface 106 of the burner recedes from the general surface 107 of the furnace wall.

However, in the above-described furnaces, the burnt gas which circulated in the combustion chamber returns to the regenerative combustion burner in a direction opposed to the direction in which the fuel and supply air were expelled, resulting in the following problems:

First, a portion of the fuel gas is drawn along by the returning burnt gas causing a short passage of non-burned fuel gas from the expelled fuel to the exhaust gas, accompanied by an increase in the amount of carbon monoxide in the exhaust gas.

Second, to prevent the increase in the amount of carbon monoxide in the exhaust gas, combustion air needs to be supplied in excessive amounts. As a result, the thermal efficiency is decreased, and a local high temperature region is generated in the furnace, accompanied by an increase in the amount of NOx (nitrogen oxides) generated.

Third, to prevent a short passage of a portion of fuel from the expelled fuel to the exhaust gas, the combustion chamber needs to be increased in size so that the exhaust gas flow does not seriously affect the flow of expelled fuel. As a result, the furnace becomes large and the thermal efficiency of the furnace is decreased.

SUMMARY OF THE INVENTION

An object of the present invention is to provide a combustion apparatus which has a regenerative combustion burner that can realize at least one of decreasing the amount of carbon monoxide in the exhaust gas, increasing a thermal efficiency of the furnace, decreasing the amount of nitrogen oxides in the exhaust gas, or making the furnace compact.

The above-described object of the present invention can be performed by the following combustion apparatus:

(1) A combustion apparatus includes a single-type regenerative combustion burner, and a combustion chamber. Fuel and air are expelled into the combustion chamber through the regenerative combustion burner and react with each other to generate burnt gas which circulates to the regenerative combustion burner and is exhausted through the regenerative combustion burner. The regenerative combustion burner includes a fuel expelling mechanism, a heat storing member disposed around the fuel expelling mechanism, and an air supply and gas exhaust switching mechanism communicating with the heat storage member. A configuration of the combustion chamber and an arrangement of the regenerative combustion burner to the combustion chamber are determined so that a first direction in which the fuel and supply air are expelled into the combustion chamber is directed such that it is substantially tangential to the combustion chamber and a second direction in which the circulating burnt gas returns to the regenerative combustion burner is not opposed to the first direction.

(2) The single-type regenerative combustion burner includes a plurality of air supply and gas exhaust nozzles disposed around the fuel expelling mechanism. The heat storage member is divided into a plurality of sections which correspond to the plurality of air supply and gas exhaust nozzles and are independent of each other. The air supply and gas exhaust switching mechanism is constructed of a rotary-type switching mechanism which continuously switches air supply and gas exhaust.

(3) The regenerative combustion burner includes an air supply and gas exhaust surface. The configuration of the combustion chamber and the arrangement of the regenerative combustion burner to the combustion chamber are determined so that the second direction is substantially perpendicular to the first direction and substantially parallel to the air supply and gas exhaust surface of the regenerative combustion burner.

(4) The single-type regenerative combustion burner includes a plurality of air supply and gas exhaust nozzles disposed around the fuel expelling mechanism. The heat storage member is divided into a plurality of sections which correspond to the plurality of air supply and gas exhaust nozzles and are independent of each other. The air supply and gas exhaust switching mechanism is constructed of a rotary-type switching mechanism which continuously switches air supply and gas exhaust. The configuration of the combustion chamber and the arrangement of the regenerative combustion burner to the combustion chamber are determined so that the second direction is substantially perpendicular to the first direction.

(5) A plurality of regenerative combustion burners are disposed in a single burnt gas circulation plane.

(6) A plurality of regenerative combustion burners are disposed in parallel with each other and are spaced from each other in a longitudinal direction of the combustion chamber.

(7) The combustion apparatus is, for example, a crucible-type smelting furnace.

In the combustion apparatus having any one of the above-described features (1), (2), (3), and (4), the flow direction of the burnt gas returning to the regenerative combustion burner is not opposed to the flow direction of the fuel and supply expelled from the burner. As a result, generation of a short passage of fuel gas from the expelled fuel to the exhaust gas is prevented and the amount of carbon monoxide in the exhaust gas is decreased. Further, since the excess supply air is not needed, the supply air and the oxygen concentration are allowed to be decreased to a lower limit, whereby the thermal efficiency is improved. Further, generation of a local heated point is prevented, and NOx generation is suppressed. Furthermore, since the size of the furnace is not increased to eliminate the opposed flow, the furnace is compact.

In the combustion apparatus having the above-described feature (5), since a plurality of burners are disposed in a single plane, the temperature of the combustion chamber is uniform in the circumferential direction of the furnace.

In the combustion apparatus having the above-described feature (6), since a plurality of burners are spaced from each other in the longitudinal direction of the combustion chamber, the temperature of the interior of the furnace can be zone-controlled even though the zones are not divided by particular partitions.

In the combustion apparatus having the above-described feature (7), by disposing the crucible at the center of the furnace, the crucible can be heated uniformly in the circumferential direction of the furnace and can be compact in size.

DETAILED DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 19:
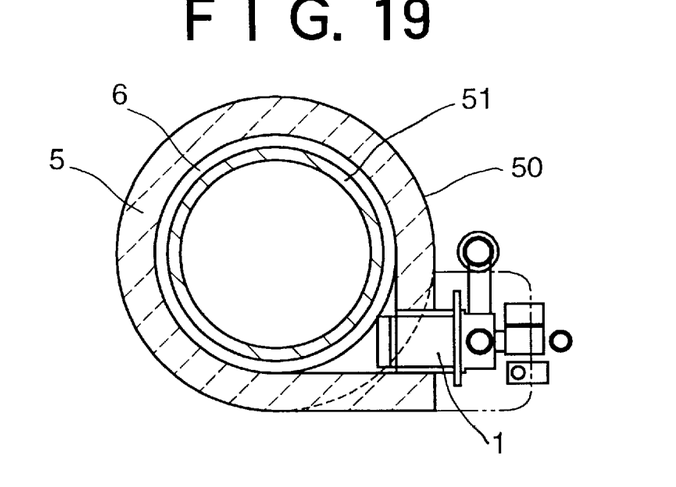
FIG. 19 is a schematic transverse cross-sectional view of a crucible type combustion apparatus according to a fourteenth embodiment of the present invention.
Figure 20:
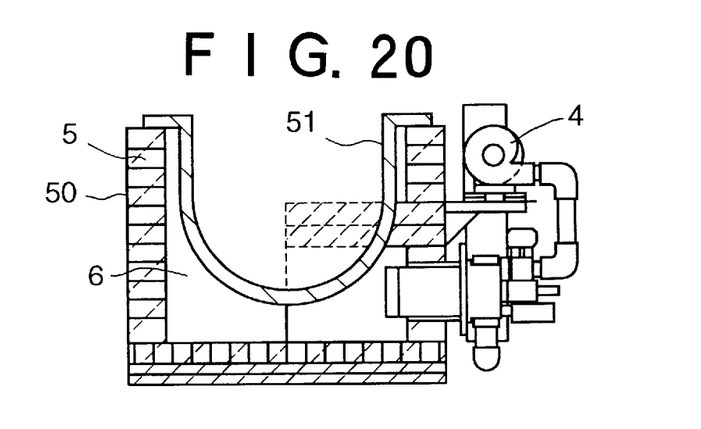
FIG. 20 is a schematic longitudinal cross-sectional view of the apparatus of FIG. 19.
Figure 21:
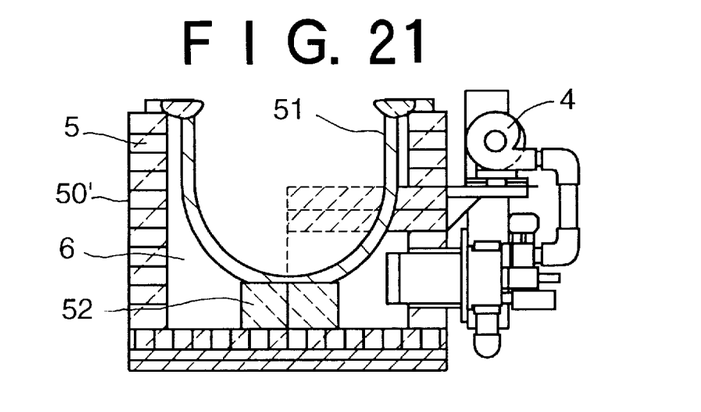
FIG. 21 is a schematic longitudinal cross-sectional view of a crucible type combustion apparatus according to a fifteenth embodiment of the present invention.

FIGS. 1–13 illustrate combustion chambers of combustion apparatuses according to first through thirteenth embodiments of the present invention. FIGS. 14–18 illustrate single-type regenerative combustion burners according to this invention. FIGS. 19–21 illustrate a crucible-type combustion apparatuses according to fourteenth and fifteenth embodiments of the present invention. Structural portions common to all of the embodiments of the present invention are denoted with like reference numerals throughout all of the embodiments of the present invention.

First, the structural portions common to all of the embodiments of the present invention will be explained with reference to, for example, FIGS. 1 and 14.

Figure 1:
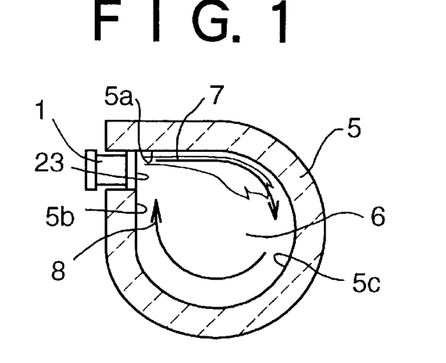
FIG. 1 is a schematic cross-sectional view of a combustion apparatus according to a first embodiment of the present invention.
Figure 14:
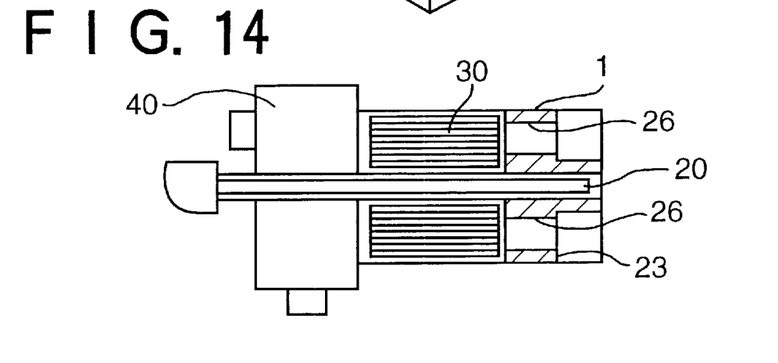
FIG. 14 is a schematic cross-sectional view of a regenerative combustion burner of the combustion apparatus according to any embodiment of the present invention.

As illustrated in FIGS. 1 and 14, a combustion apparatus according to any embodiment of the present invention includes a single-type regenerative combustion burner 1 (hereinafter, burner) and a combustion chamber 6. Fuel gas and supply air (air for combustion) are expelled into the combustion chamber 6 through the burner 1. The fuel and air react with each other to generate burnt gas 8 (exhaust gas) which circulates in the combustion chamber 6 to the burner 1. The burnt gas is exhausted through the burner 1 to the atmosphere.

As illustrated in FIG. 14, the single-type regenerative combustion burner includes a fuel expelling mechanism 20, a heat storage member 30 disposed around the fuel expelling mechanism 20, and an air supply and gas exhaust switching mechanism 40 (hereinafter, switching mechanism) in a passage communicating with the heat storage member 30.

As illustrated in FIG. 1, a configuration of the combustion chamber 6 and arrangement of the regenerative combustion burner 1 to the combustion chamber 6 are determined so that a first direction in which the fuel and supply air 7 are expelled from the burner 1 into the combustion chamber 6 is directed to be substantially tangential to the combustion chamber 6 and a second direction in which the circulating burnt gas 8 returns to the regenerative combustion burner 1 is not opposed to the first direction.

As illustrated in FIG. 14, the single-type regenerative combustion-type burner 1 includes a plurality of air supply and gas exhaust nozzles 26 (gas passing holes) disposed around the fuel expelling mechanism 20. The air supply and gas exhaust nozzles 26 are open to an air supply and gas exhaust surface 23 which is perpendicular to an axis of the burner 1. The heat storage member 30 is divided into a plurality of sections which correspond to the plurality of air supply and gas exhaust nozzles 26 and are independent of each other. An arrangement illustrated in FIG. 16 where each section of the member 30 is disposed in each of a plurality of cylindrical sleeves, an arrangement illustrated in FIG. 17 where the member 30 is divided by radially extending plates, and an arrangement illustrated in FIG. 18 where separate sections are arranged so as to be symmetrical with respect to the fuel expelling mechanism 20 are included in the above-described independent arrangement of the sections of the heat storage member 30. The switching mechanism 40 (FIG. 14) is constructed of a rotary-type switching mechanism which continuously switches air supply and gas exhaust. The switching mechanism may be rotated in one direction by a motor or in reciprocal directions by an air cylinder.

Figure 9:
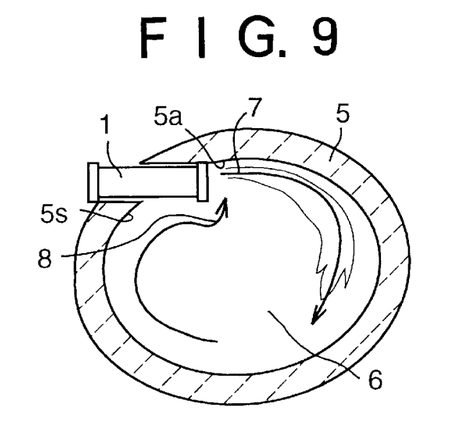
FIG. 9 is a schematic cross-sectional view of a combustion apparatus according to a ninth embodiment of the present invention.

As illustrated in FIG. 1, the regenerative combustion burner 1 includes an air supply and gas exhaust surface 23. Preferably, as illustrated in FIG. 1, the configuration of the combustion chamber 6 and the arrangement of the regenerative combustion burner 1 to the combustion chamber 6 are selected so that the second direction is substantially perpendicular to the first direction and substantially parallel to the air supply and gas exhaust surface 23 of the regenerative combustion burner 1. As illustrated in FIG. 9, the configuration of the combustion chamber 6 and the arrangement of the regenerative combustion burner 1 to the combustion chamber 6 may be determined so that the second direction is inclined from a direction perpendicular to the first direction, for example, in a front or rear direction so long as the returning burnt gas is not opposed to the fuel and supply air flow expelled from the burner 1.

More particularly, as one may see illustrated in FIG. 1, the furnace has a first furnace wall surface 5a and a second furnace wall surface 5b which are located adjacent to the burner 1. The first direction in which the fuel and supply air are expelled from the burner is directed parallel to and along the first furnace wall surface 5a and the second direction in which the burnt gas returns to the burner 1 is directed parallel to and along the second furnace wall surface 5b. It is preferable that the second furnace wall surface 5b and the air supply and gas exhaust surface 23 of the burner 1 are located in a common plane.

The above-described structure of the burner 1 and the above-described arrangement of the burner 1 to the combustion chamber 6 may be combined. In such a combined structure, the single-type regenerative combustion burner 1 includes a plurality of air supply and gas exhaust nozzles 26 disposed around the fuel expelling mechanism 20. The heat storage member 30 is divided into a plurality of sections which correspond to the plurality of air supply and gas exhaust nozzles 26 and are independent of each other. The air supply and gas exhaust switching mechanism 40 is constructed of a rotary-type switching mechanism which continuously switches air supply and gas exhaust. The configuration of the combustion chamber 6 and the arrangement of the regenerative combustion burner 1 to the combustion chamber 6 are determined so that the second direction is substantially perpendicular to the first direction.

Figure 15:
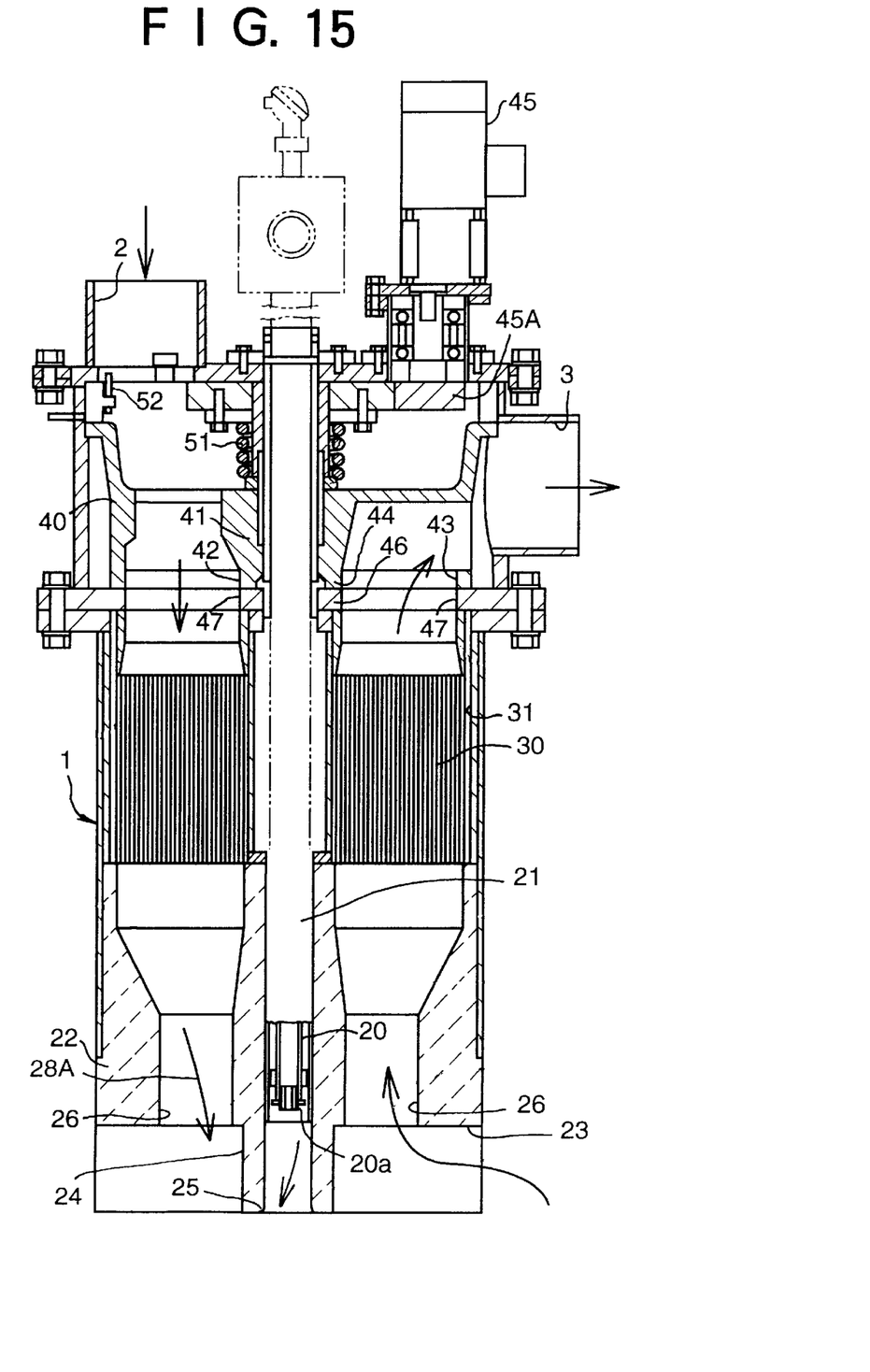
FIG. 15 is a detailed cross-sectional view of the regenerative combustion burner of FIG. 14.
Figure 16:
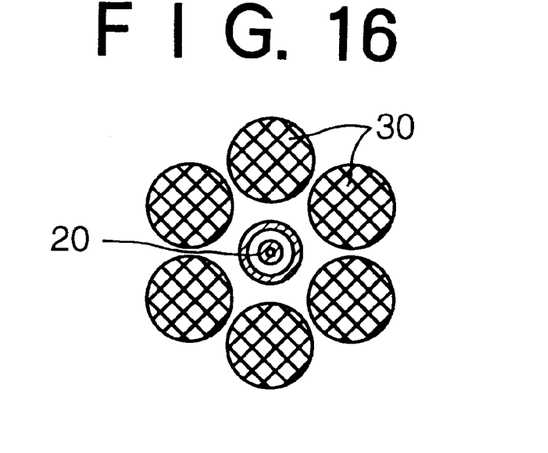
FIG. 16 is a schematic transverse cross-sectional view of one type of a heat storage member which can be mounted to the regenerative combustion burner of FIG. 14.
Figure 17:
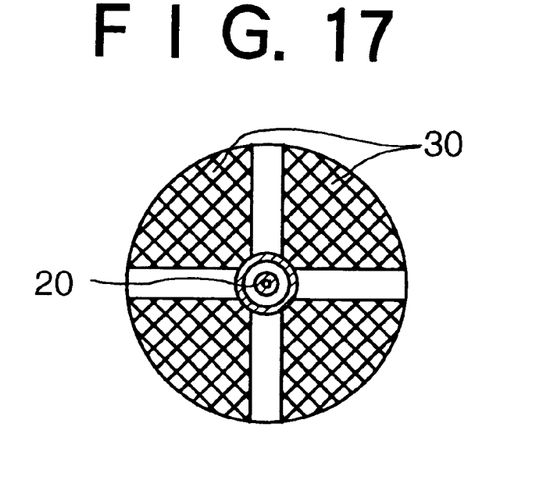
FIG. 17 is a schematic transverse cross-sectional view of another type of a heat storage member which can be mounted to the regenerative combustion burner of FIG. 14.
Figure 18:
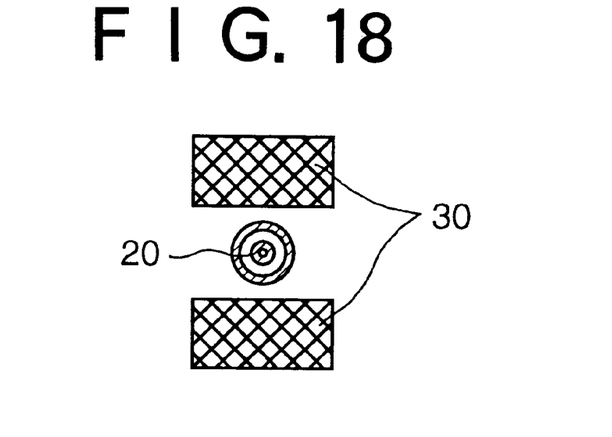
FIG. 18 is a schematic transverse cross-sectional view of a third type of a heat storage member which can be mounted to the regenerative combustion burner of FIG. 14.

FIG. 15 illustrates a detailed structure of the single-type regenerative combustion burner 1. The burner 1 is connected to an air supply device (a blower, a compressor, etc.) via an air supply passage 2, and is connected to the atmosphere via an exhaust passage 3. Pilot air which is supplied through a passage defined between an inside surface of a pilot air pipe 21 and an outside surface of the fuel expelling mechanism 20 and main air which is heated to a high temperature (for example, 900° C.) when passing through the heat storage member 30 are expelled into the combustion chamber 6 inside the furnace wall 5. The heat of the exhaust gas is retrieved by the heat storage member 30 when passing through the heat storage member 30 and is lowered in temperature (for example, to about 200° C.), and is exhausted to the atmosphere. The switching mechanism 40 switches air supply and gas exhaust through the heat storage member 30, whereby the heat which the heat storage member 30 stores is released to supply air thereby pre-heating the supply air.

The fuel expelling mechanism 20 extends axially at a center of the burner 1. The pilot air pipe 21 is coaxial with the fuel expelling mechanism 20. The fuel expelling mechanism 20 has a pilot fuel exit 20a at an end portion of the mechanism 20 through which a portion of the fuel gas flows out as pilot fuel. The end portion of the fuel expelling mechanism 20 is not covered with an electrical insulator. An electrical spark is generated between the end portion of the fuel expelling mechanism 20 and the pilot air pipe 21 so that the pilot air is ignited to form a pilot flame.

A burner tile 22 is disposed so as to surround the end portion of the fuel expelling mechanism 20. The burner tile 22 has the air supply and gas exhaust surface 23 and a protrusion 24 which protrudes from the surface 23. A fuel release surface 25 is formed inside the protrusion 24 and is spread toward a downstream direction of the fuel gas flow. The plurality of air supply and gas exhaust nozzles 26 are open to the surface 23. Due to switching by the switching mechanism 40, each nozzle 26 operates as an air supply hole at one time and as a gas exhaust hole at another time.

The heat storage member 30 is made from heat-resistant material, for example, ceramics, heat-resistant metals, etc. To maintain a large gas contact surface, the heat storage member 30 is constructed from a honeycomb structure or may be constructed from a bundle of rods and pipes. The heat storage member 30 causes gas to flow in the axial direction of the member 30. The heat storage member 30 may be divided into a plurality of portions in the axial direction so that a crack does not initiate in the member 30 due to the temperature gradient. In the embodiment of FIG. 15, the divided sections of the heat storage member 30 are housed in the plurality of cylindrical sleeves 31.

The switching mechanism 40 includes a rotatable disk (a rotor) 44 and a stationary disk 46 which slidably contact each other. The rotatable disk 44 has a plurality of openings 42 and 43 which are open and closed corresponding to rotation of the rotatable disk 44, and the stationary disk 46 has a plurality of penetration holes 47. The opening 42 is located on one side of a partition wall 41 and the opening 43 is located on another side of the partition wall 41.

A portion of the switching mechanism 40 is a rotatable member. In the embodiment of FIG. 15, the rotatable disk 44 and the partition wall 41 are included in the rotatable member. The rotatable member of the switching mechanism 40 is rotated in one direction or reciprocal directions by a drive device 45 (an electrical motor or an air cylinder). To seal the contact portion of the rotatable member and the stationary member, the rotatable disk 44 is pressed against the stationary disk 46 by springs 51 and 52.

Operation and technical advantages of the above-described structure common to all of the embodiments of the present invention will now be explained.

Since the configuration of the combustion chamber 6 and the arrangement of the regenerative combustion burner 1 to the combustion chamber 6 are selected so that the circulating burnt gas 8 returns to the regenerative combustion burner 1 in the second direction which is not opposed to the first direction in which the fuel and supply air 7 are expelled into the combustion chamber 6, the returning burnt gas 8 does not draw and drag along the fuel and supply gas.

As a result, generation of a short passage of the fuel from the expelling fuel and supply air to the exhaust gas is suppressed, and an increase in the amount of carbon monoxide in the exhaust gas due to the non-burned fuel is also suppressed, thereby yielding a low amount of carbon monoxide exhaust gas.

Further, since the combustion air does not need to be supplied in amounts greater than what is theoretically needed in order to cause carbon monoxide to be completely burned, the amount of supply air can be decreased to the lower limit thereof. As a result, the oxygen concentration can be decreased (that is, the air ratio can be near 1), so that the thermal efficiency can be high (that is, a perfect combustion can be yielded by the minimum air).

Furthermore, since the flame and the burnt gas generated by reaction of the fuel and supply air 7 expelled from the burner 1 flow around within the furnace and return to the burner 1, a high temperature range is uniformly produced at a peripheral portion of the combustion chamber. When the burnt gas flows around in the furnace, a portion of the burnt gas 8 and the supplied fuel and air 7 are mixed with each other to make the combustion slack, whereby generation of NOx is suppressed.

Since a local high temperature range is unlikely to be generated near the exit of the supply air due to the above-described slack combustion, the heat flux tends to extend in the entire circumference of the peripheral portion of the combustion chamber and the temperature of the peripheral portion is uniform. As a result, the workpiece to be heated which is disposed at the center of the furnace will be heated uniformly from the gas having a high temperature flowing in the peripheral portion of the combustion chamber due to radiation and from the inside surface of the furnace which is heated by the gas and is at a high temperature.

Furthermore, since the size of the furnace is not increased to remove the opposed flow, and the heat flux is extended along the entire circumference of the combustion chamber, the thermal efficiency is greatly increased so that the space of the combustion chamber 6 and the size of the furnace can be compact. This facilitates the construction of the furnace and enables a decrease in the construction cost.

Next, structures and technical advantages which are unique to each embodiment will be explained.

With respect to a first embodiment of the present invention, as illustrated in FIG. 1, the combustion chamber 6 is defined and surrounded by a first furnace wall surface 5a located adjacent to the regenerative combustion burner 1 and extending straight in a direction substantially parallel to the first direction (the expelling direction of the fuel and supply air 7), a second furnace wall surface 5b, located adjacent to the regenerative combustion burner 1 and extending straight in the second direction (the burnt gas returning direction) and perpendicularly to the first direction, and a third furnace wall surface 5c connecting the first furnace wall surface 5a and the second furnace wall surface 5b and extending in the manner of an arc over about three quarters of a circle. The third furnace wall surface 5c has a portion which is opposed to the flow of the fuel and supply air 7 expelled from the burner 1 and is smoothly curved. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 2:
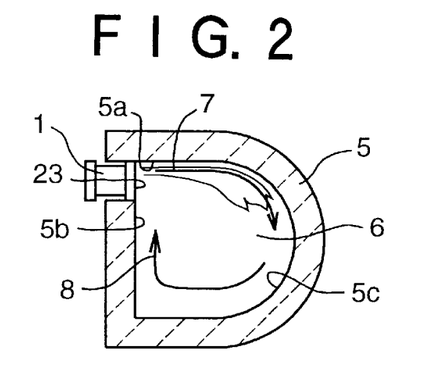
FIG. 2 is a schematic cross-sectional view of a combustion apparatus according to a second embodiment of the present invention.

With respect to a second embodiment of the present invention, as illustrated in FIG. 2, the combustion chamber 6 is defined and surrounded by: (1) the first furnace wall surface 5a located adjacent to the regenerative combustion burner 6 and extending straight in a direction substantially parallel to the first direction; (2) the second furnace wall surface 5b, located adjacent to the regenerative combustion burner 1 and extending straight in the second direction and perpendicularly to the first direction; and (3) the third furnace wall surface 5c connecting the first furnace wall surface 5a and the second furnace wall surface 5b and extending in the manner of an arc over about a half of a circle. The third furnace wall surface 5c has a portion which is opposed to the flow of the fuel and supply air 7 expelled from the burner 1 and is smoothly curved. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 3:
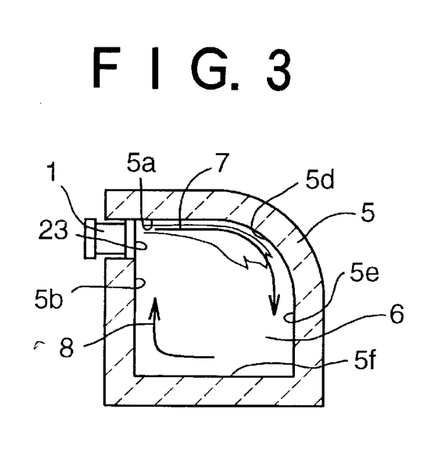
FIG. 3 is a schematic cross-sectional view of a combustion apparatus according to a third embodiment of the present invention.

With respect to a third embodiment of the present invention, as illustrated in FIG. 3, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; (3) a fourth furnace wall surface 5d connected to the first furnace wall surface 5a and extending in the manner of an arc over about a quarter of a circle; (4) a fifth furnace wall surface 5e connected to the fourth furnace wall surface 5d and extending straight in a direction substantially parallel to the second furnace wall surface 5b; and (5) a sixth furnace wall surface 5f connecting the second furnace wall surface 5b and the fifth furnace wall surface 5e and extending straight substantially parallel to the first furnace wall surface 5a. The fourth furnace wall surface 5d is opposed to the flow of the fuel and supply air 7 expelled from the burner 1 and is smoothly curved. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 4:
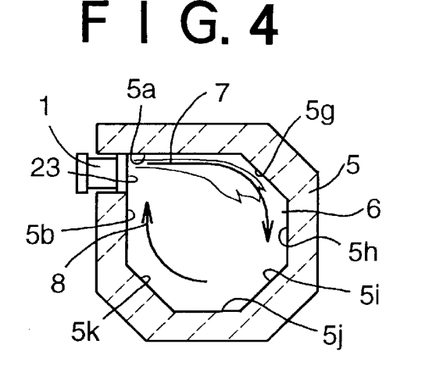
FIG. 4 is a schematic cross-sectional view of a combustion apparatus according to a fourth embodiment of the present invention.

With respect to a fourth embodiment of the present invention, as illustrated in FIG. 4, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; (3) a seventh furnace wall surface 5g connected to the first furnace wall surface 5a and extending straight at an angle (for example, an angle of about 45 degrees) with respect to the first furnace wall surface 5a; (4) an eighth furnace wall surface 5h connected to the seventh furnace wall surface 5g and extending straight in a direction substantially parallel to the second furnace wall surface 5b; (5) a ninth furnace wall surface 5i connected to the eighth furnace wall surface 5h and extending straight at an angle (for example, an angle of 45 degrees) with respect to the eighth furnace wall surface 5h; (6) a tenth furnace wall surface 5j connected to the ninth furnace wall surface 5i and extending straight in a direction substantially parallel to the first furnace wall surface 5a; and (7) an eleventh furnace wall surface 5k connecting the second furnace wall surface 5b and the tenth furnace wall surface 5j and extending straight substantially parallel to the seventh furnace wall surface 5g. The seventh furnace wall surface 5g is opposed to the flow of the fuel and supply air 7 expelled from the burner 1 and extends straight. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 5:
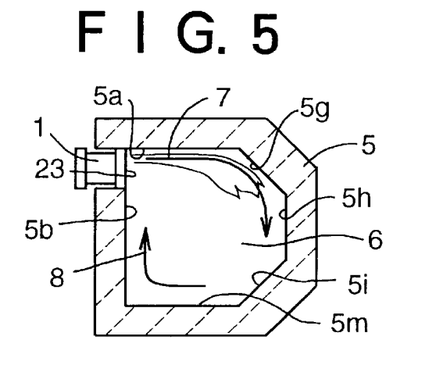
FIG. 5 is a schematic cross-sectional view of a combustion apparatus according to a fifth embodiment of the present invention.

With respect to a fifth embodiment of the present invention, as illustrated in FIG. 5, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; (3) a seventh furnace wall surface 5g connected to the first furnace wall surface 5a and extending straight at an angle (for example, an angle of about 45 degrees) with respect to the first furnace wall surface 5a; (4) an eighth furnace wall surface 5h connected to the seventh furnace wall surface 5g and extending straight in a direction substantially parallel to the second furnace wall surface 5b; (5) a ninth furnace wall surface 5i connected to the eighth furnace wall surface 5h and extending straight at an angle (for example, an angle of 45 degrees) with respect to the eighth furnace wall surface 5h; and (6) a twelfth furnace wall surface 5m connecting the second furnace wall surface 5b and the ninth furnace wall surface 5i and extending straight substantially parallel to the first furnace wall surface 5a. The seventh furnace wall surface 5g is opposed to the flow of the fuel and supply air 7 expelled from the burner 1 and extends straight. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 6:
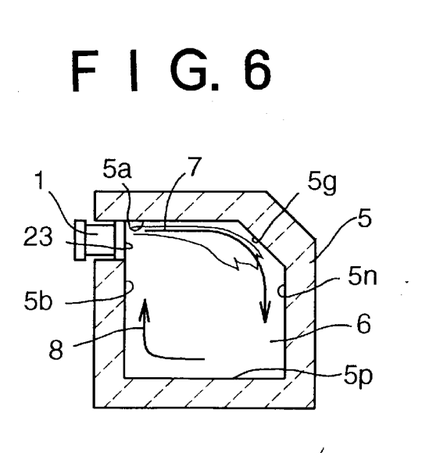
FIG. 6 is a schematic cross-sectional view of a combustion apparatus according to a sixth embodiment of the present invention.

With respect to a sixth embodiment of the present invention, as illustrated in FIG. 6, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; (3) a seventh furnace wall surface 5g connected to the first furnace wall surface 5a and extending straight at an angle (for example, an angle of about 45 degrees) with respect to the first furnace wall surface 5a; (4) a thirteenth furnace wall surface 5n connected to the seventh furnace wall surface 5g and extending straight in a direction substantially parallel to the second furnace wall surface 5b; and (5) a fourteenth furnace wall surface 5p connecting the second furnace wall surface 5b and the thirteenth furnace wall surface 5n and extending straight substantially parallel to the first furnace wall surface 5a. The seventh furnace wall surface 5g is opposed to the flow of the fuel and supply air 7 expelled from the burner 1 and extends straight. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 7:
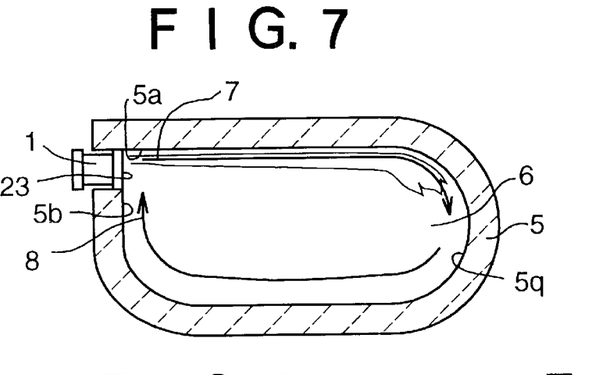
FIG. 7 is a schematic cross-sectional view of a combustion apparatus according to a seventh embodiment of the present invention.

With respect to a seventh embodiment of the present invention, as illustrated in FIG. 7, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; and (3) a fifteenth furnace wall surface 5q connecting the first furnace wall surface 5a and the second furnace wall surface 5b and extending in the shape of an elongated arc elongated in the first direction over about three quarters of an elongated circle. The fifteenth furnace wall surface 5q has a portion opposed to the flow of the fuel and supply air 7 expelled from the burner 1 and curves smoothly. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 8:
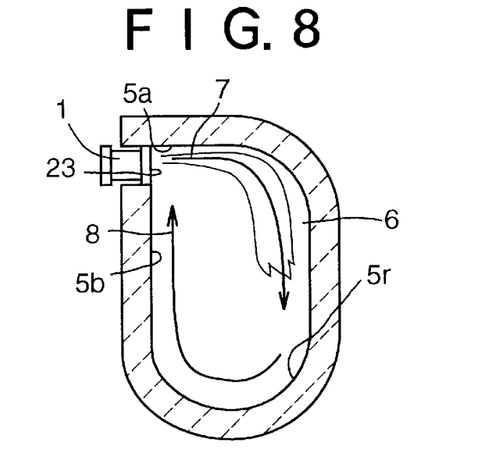
FIG. 8 is a schematic cross-sectional view of a combustion apparatus according to an eighth embodiment of the present invention.

With respect to an eighth embodiment of the present invention, as illustrated in FIG. 8, the combustion chamber 6 is defined and surrounded by: (1) the first furnace wall surface 5a located adjacent to the regenerative combustion burner 1 and extending straight in a direction substantially parallel to the first direction; (2) the second furnace wall surface 5b located adjacent to the regenerative combustion burner 1 and extending straight in the second direction and perpendicularly to the first direction; and (3) a sixteenth furnace wall surface 5r connecting the first furnace wall surface 5a and the second furnace wall surface 5b and extending in the shape of an elongated arc elongated in a direction perpendicular to the first direction over about three quarters of an elongated circle. The sixteenth furnace wall surface 5r has a portion opposed to the flow of the fuel and supply air 7 expelled from the burner 1 and curves smoothly. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

With respect to a ninth embodiment of the present invention, as illustrated in FIG. 9, the combustion chamber 6 has a transverse cross section having a substantially circular configuration. The regenerative combustion burner 1 is arranged so as to extend substantially tangential to the combustion chamber 6. The combustion chamber 6 is defined and surrounded by a substantially circular furnace wall surface which includes the first furnace wall surface 5a located adjacent to the regenerative combustion burner and extending substantially parallel to the first direction and a seventeenth furnace wall surface 5s located adjacent to the regenerative combustion burner 1 and extends in the second direction inclined from a direction perpendicular to the first direction. The air supply and gas exhaust surface 23 of the regenerative combustion burner 1 is located inside the substantially circular furnace wall surface so that the burnt gas 8 returns to the regenerative combustion burner 1 from a rear side of the air supply and gas exhaust surface 23 of the regenerative combustion burner 1.

Due to this structure and arrangement, the flow of the burnt gas 8 returning to the burner 1 is not opposed to the flow of the fuel and supply air 7 expelled from the burner 1.

Figure 10:
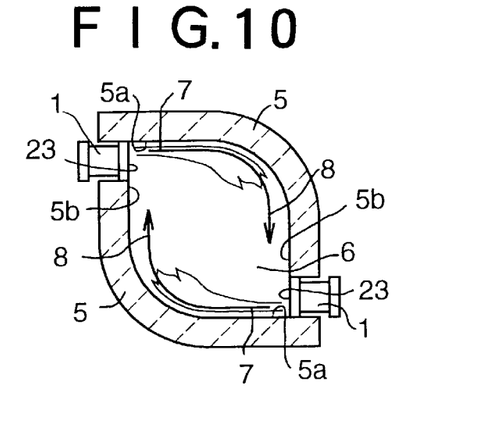
FIG. 10 is a schematic cross-sectional view of a combustion apparatus according to a tenth embodiment of the present invention.

With respect to a tenth embodiment of the present invention, as illustrated in FIG. 10, a plurality of regenerative combustion burners 1 are disposed in a single burnt gas circulation plane. Each of the regenerative combustion burners 1 is disposed between the first furnace wall surface 5a located adjacent to the regenerative combustion burner 1 and extending straight in a direction substantially parallel to the first direction and the second furnace wall surface 5b located adjacent to the regenerative combustion burner 1 and extending straight in the second direction. The combustion chamber 6 is defined and surrounded by the first furnace wall surfaces 5a and the second furnace wall surfaces 5b. The regenerative combustion burner 1 is disposed in the second furnace wall surface 5b. The air supply and gas exhaust surface 23 of the regenerative combustion burner 1 and the second furnace wall surface 5b are located in a substantially common plane.

Due to this structure and arrangement, the flow of the burnt gas 8 returning to the burner 1 is substantially perpendicular to the flow of the fuel and supply air 7 expelled from the burner 1 and is not opposed to the flow of the fuel and supply air 7.

Figure 11:
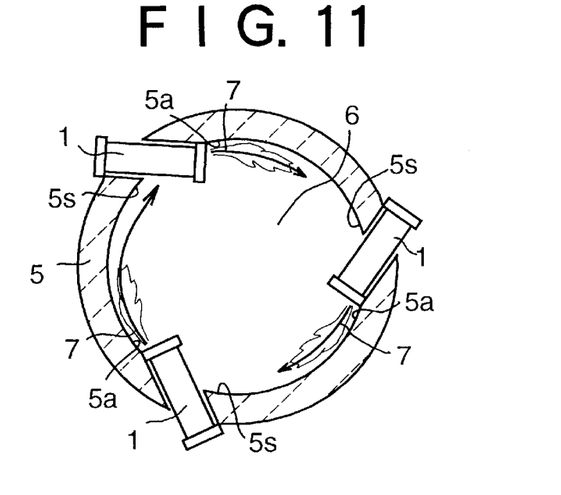
FIG. 11 is a schematic cross-sectional view of a combustion apparatus according to an eleventh embodiment of the present invention.

With respect to an eleventh embodiment of the present invention, as illustrated in FIG. 11, a plurality of regenerative combustion burners 1 are disposed in a single burnt gas circulation plane. The combustion chamber 6 has a substantially circular cross section. Each of the plurality of regenerative combustion burners 1 is directed so as to be substantially tangential to the combustion chamber 6. The combustion chamber 6 is surrounded by a circular furnace wall surface which includes a first furnace wall surface 5a located adjacent to the regenerative combustion burner 1 and extending substantially parallel to the first direction and a seventeenth furnace wall surface 5s located adjacent to the regenerative combustion burner Sb and extending in the second direction inclined from a direction perpendicular to said first direction. The air supply and gas exhaust surface 23 of the burner 1 is located inside the circular surface wall surface so that the burnt gas 8 returns to the regenerative combustion burner 1 from a rear side of the air supply and gas exhaust surface 23 of the regenerative combustion burner 1.

Due to this structure and arrangement, the flow of the burnt gas 8 returning to the burner 1 is not opposed to the flow of the fuel and supply air 7 expelled from the burner 1.

Figure 12:
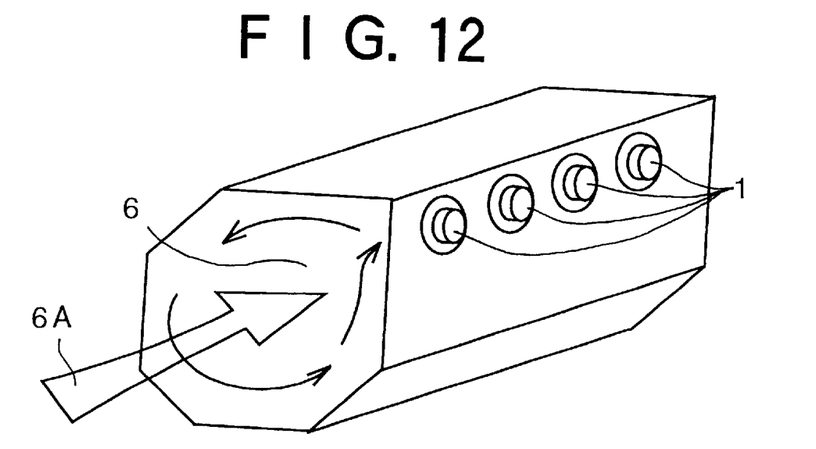
FIG. 12 is a schematic cross-sectional view of a combustion apparatus according to a twelfth embodiment of the present invention.

With respect to a twelfth embodiment of the present invention, as illustrated in FIG. 12, the combustion chamber 6 and the furnace have a longitudinal direction 6A. A plurality of (for example, four) regenerative combustion burners 1 are disposed in parallel with each other and are spaced from each other in the longitudinal direction 6A of the combustion chamber 6. In the twelfth embodiment of the present invention, the longitudinal direction of the combustion chamber 6 is directed horizontally. The transverse cross section of the combustion chamber 6 at each burner 1 is the same as that of the combustion chamber according to any (for example, the fourth) embodiment of the present invention.

Due to this structure and arrangement, the flow of the burnt gas 8 returning to the burner 1 is not opposed to the flow of the fuel and supply air 7 expelled from the burner 1 as in the fourth embodiment of the present invention. Further, the circulating flow at one burner 1 is substantially independent of another circulating flow at another burner 1 so that the combustion, the circulating flow, and the temperature at a zone corresponding to one burner 1 can be controlled (can be zone-controlled) substantially independently of another zone corresponding to another burner 1.

Figure 13:
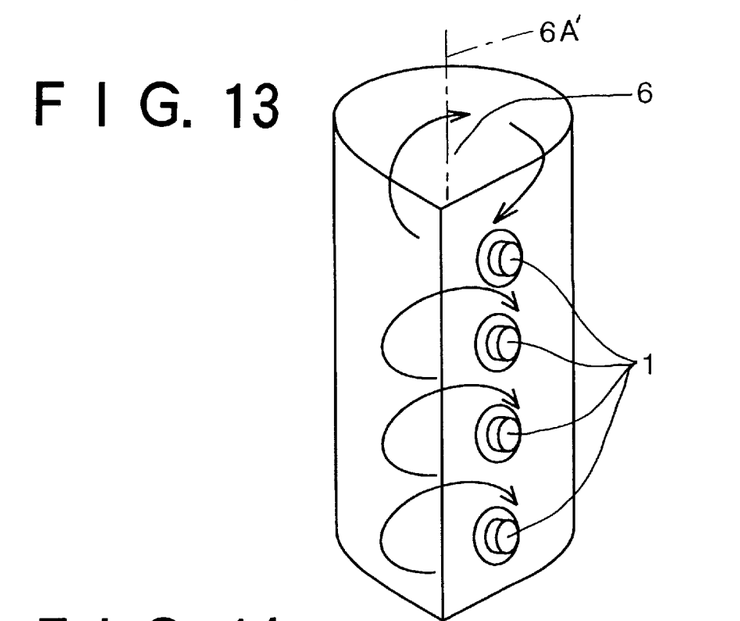
FIG. 13 is a schematic cross-sectional view of a combustion apparatus according to a thirteenth embodiment of the present invention.

With respect to a thirteenth embodiment of the present invention, as illustrated in FIG. 13, the combustion chamber 6 and the furnace have a longitudinal direction 6A'. A plurality of (for example, four) regenerative combustion burners 1 are disposed in parallel with each other and are spaced from each other in the longitudinal direction of the combustion chamber 6. In the thirteenth embodiment of the present invention, the longitudinal direction of the combustion chamber 6 is directed vertically. The transverse cross section of the combustion chamber 6 at each burner 1 is the same as that of the combustion chamber according to any (for example, the first) embodiment of the present invention.

Due to this structure and arrangement, the flow of the burnt gas 8 returning to the burner 1 is not opposed to the flow of the fuel and supply air 7 expelled from the burner 1 as in the first embodiment of the present invention. Further, the circulating flow at one burner 1 is substantially independent of another circulating flow at another burner 1 so that the combustion, the circulating flow, and the temperature at a zone corresponding to one burner 1 can be controlled (can be zone-controlled) substantially independently of another zone corresponding to another burner 1.

Next, structures and technical advantages of various combustion furnaces (including various industrial furnaces and boilers) to which the combustion apparatus of the present invention is applied will be explained.

FIGS. 19 and 20 illustrate a smelting furnace 50 having a crucible according to a fourteenth embodiment of the present invention. The furnace 50 includes a furnace wall 5 and a crucible 51 supported from the upper end of the side wall of the furnace wall 5 and disposed at a center of the combustion chamber 6 defined within the furnace wall. The furnace further includes an annular space between the inside surface of the furnace wall 5 and the outside surface of the crucible 51, the single-type regenerative combustion burner 1 fixed to the furnace wall 5, and an air supply device 4 (a blower, a fan, and a compressor, etc.) installed in the air supply passage connected to the burner 1. The arrangement of the burner 1 with respect to the combustion chamber 6 may be any of the arrangements of FIGS. 1 to 13 (for example, the arrangement of FIG. 1).

Due to this structure, since the burnt gas flows through the annular space between the crucible and the furnace wall, the temperature of the annular space is substantially uniform over the entire circumference of the space so that the crucible can be uniformly heated from the outside. Further, the thermal load can be raised, and the furnace can be made compact. For example, a diameter of the smelting furnace is smaller than a conventional smelting furnace of a similar capacity. More particularly, the diameter of the furnace of the present invention is 1200 mm, while that of the conventional furnace is 1400 mm.

FIG. 21 illustrates a smelting furnace 50' having the crucible 51 according to a fifteenth embodiment of the present invention. In the furnace 50', the crucible 51 is supported via a support 52 by the bottom wall of the furnace 50'. Other structures and technical advantages of the fifteenth embodiment of the present invention are the same as those of the fourteenth embodiment of the present invention.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A combustion apparatus, comprising:
  a single-type regenerative combustion burner, comprising:
    a fuel expelling mechanism;
    a heat storage member disposed around said fuel expelling mechanism; and
    an air supply and gas exhaust switching mechanism which selectively causes air supply and gas exhaust to communicate with said heat storage member; and
  a combustion chamber, fuel and air being expelled into said combustion chamber through said regenerative combustion burner and reacting with each other to generate burnt gas which circulates to said regenerative combustion burner and is exhausted through said regenerative combustion burner, and
  wherein said combustion chamber and said regenerative combustion burner are constructed and arranged so that said fuel and supply air are expelled into said combustion chamber in a first direction, substantially tangential to said combustion chamber, and said circulating burnt gas returns to said regenerative combustion burner in a second direction which is not opposed to said first direction, and
  wherein said regenerative combustion burner includes an air supply and gas exhaust surface nonreceded from said combustion chamber, and wherein said configuration of said combustion chamber and said arrangement of said regenerative combustion burner to said combustion chamber are such that said second direction is substantially perpendicular to said first direction and substantially parallel to said air supply and gas exhaust surface.

2. An apparatus according to claim 1, wherein said single-type regenerative combustion burner includes a plurality of air supply and gas exhaust nozzles disposed around said fuel expelling mechanism; said heat storage member is divided into a plurality of sections which correspond to said plurality of air supply and gas exhaust nozzles and are independent of each other; and said air supply and gas exhaust switching mechanism is constructed of a rotary-type switching mechanism which continuously switches air supply and gas exhaust.

3. An apparatus according to claim 1, wherein said single-type regenerative combustion burner includes a plurality of air supply and gas exhaust nozzles disposed around said fuel expelling mechanism; said heat storage member is divided into a plurality of sections which correspond to said plurality of air supply and gas exhaust nozzles and are independent of each other; said air supply and gas exhaust switching mechanism is constructed of a rotary-type switching mechanism which continuously switches air supply and gas exhaust; and said configuration of said combustion chamber and said arrangement of said regenerative combustion burner to said combustion chamber are determined so that said second direction is substantially perpendicular to said first direction.

4. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, and a third furnace wall surface connecting said first furnace wall surface and said second furnace wall surface and extending in the manner of an arc over about three quarters of a circle, and wherein said regenerative combustion burner is disposed in said second furnace wall surface, and said air supply and gas exhaust surface of said regenerative combustion burner and said second furnace wall surface are located in a substantially common plane.

5. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, and a third furnace wall surface connecting said first furnace wall surface and said second furnace wall surface and extending in the manner of an arc over about a half of a circle, and wherein said regenerative combustion burner is disposed in said second furnace wall surface, and said air supply and gas exhaust surface of said regenerative combustion burner and said second furnace wall surface are located in a substantially common plane.

6. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, a third furnace wall surface connected to said first furnace wall surface and extending in the manner of an arc over about a quarter of a circle, a fourth furnace wall surface connected to said third furnace wall surface and extending straight in a direction substantially parallel to said second furnace wall surface, and a fifth furnace wall surface connecting said second furnace wall surface and said fourth furnace wall surface and extending straight substantially parallel to said first furnace wall surface, and wherein said regenerative combustion burner is disposed in said second furnace wall surface, and said air supply and gas exhaust surface of said regenerative combustion burner and said second furnace wall surface are located in a substantially common plane.

7. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, a third furnace wall surface connected to said first furnace wall surface and extending straight at an angle with respect to said first furnace wall surface, a fourth furnace wall surface connected to said third furnace wall surface and extending straight in a direction substantially parallel to said second furnace wall surface, a fifth furnace wall surface connected to said fourth furnace wall surface and extending straight at an angle with respect to said fourth furnace wall surface, a sixth furnace wall surface connected to said fifth furnace wall surface and extending straight in a direction substantially parallel to said first furnace wall surface, and a seventh furnace wall surface connecting said second furnace wall surface and said sixth furnace wall surface and extending straight substantially parallel to said third furnace wall surface, and wherein said regenerative combustion burner is disposed in said second furnace wall surface, and said air supply and gas exhaust surface of said regenerative combustion burner and said second furnace wall surface are located in a substantially common plane.

8. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, a third furnace wall surface connected to said first furnace wall surface and extending straight at an angle with respect to said first furnace wall surface, a fourth furnace wall surface connected to said third furnace wall surface and extending straight in a direction substantially parallel to said second furnace wall surface, a fifth furnace wall surface connected to said fourth furnace wall surface and extending straight at an angle with respect to said fourth furnace wall surface, and a sixth furnace wall surface connecting said second furnace wall surface and said fifth furnace wall surface and extending straight substantially parallel to said first furnace wall surface, and wherein said regenerative combustion burner is disposed in said second furnace wall surface, and said air supply and gas exhaust surface of said regenerative combustion burner and said second furnace wall surface are located in a substantially common plane.

9. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, a third furnace wall surface connected to said first furnace wall surface and extending straight at an angle with respect to said first furnace wall surface, a fourth furnace wall surface connected to said third furnace wall surface and extending straight in a direction substantially parallel to said second furnace wall surface, and a fifth furnace wall surface connecting said second furnace wall surface and said fourth furnace wall surface and extending straight substantially parallel to said first furnace wall surface, and wherein said regenerative combustion burner is disposed in said second furnace wall surface, and said air supply and gas exhaust surface of said regenerative combustion burner and said second furnace wall surface are located in a substantially common plane.

10. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, and a third furnace wall surface connecting said first furnace wall surface and said second furnace wall surface and extending in the shape of an elongated arc elongated in said first direction over about three quarters of an elongated circle, and wherein said regenerative combustion burner is disposed in said second furnace wall surface, and said air supply and gas exhaust surface of said regenerative combustion burner and said second furnace wall surface are located in a substantially common plane.

11. An apparatus according to claim 1, wherein said combustion chamber is defined by a first furnace wall surface located adjacent to said regenerative combustion burner and extending straight in a direction substantially parallel to said first direction, a second furnace wall surface located adjacent to said regenerative combustion burner and extending straight in said second direction, and a third furnace wall surface connecting said first furnace wall surface and said second furnace wall surface and extending in the shape of an elongated arc elongated in said second direction over about three quarters of an elongated circle, and wherein said regenerative combustion burner is disposed in said second furnace wall surface, and said air supply and gas exhaust surface of said regenerative combustion burner and said second furnace wall surface are located in a substantially common plane.

12. An apparatus according to claim 1, wherein said combustion chamber has a transverse cross section having a substantially circular configuration and said regenerative combustion burner is arranged so as to extend substantially tangential to said combustion chamber; said combustion chamber is defined and surrounded by a substantially circular furnace wall surface which includes a first furnace wall surface located adjacent to said regenerative combustion burner and extending substantially parallel to said first direction and a second furnace wall surface located adjacent to said regenerative combustion burner and extends in said second direction inclined from a direction perpendicular to said first direction; and said air supply and gas exhaust surface of said regenerative combustion burner is located inside said substantially circular furnace wall surface so that the burnt gas returns to said regenerative combustion burner from a rear side of said air supply and gas exhaust surface of said regenerative combustion burner.

13. An apparatus according to claim 1, wherein a plurality of said regenerative combustion burners are disposed in a single burnt gas circulation plane.

14. An apparatus according to claim 13, wherein each of said plurality of said regenerative combustion burners is disposed between a first furnace wall surface located adjacent to said regenerative combustion burner and extending straight in a direction substantially parallel to said first direction and a second furnace wall surface located adjacent to said regenerative combustion burner and extending straight in said second direction.

15. An apparatus according to claim 13, wherein said combustion chamber has a substantially circular cross section and is surrounded by a circular furnace wall surface which includes a first furnace wall surface located adjacent to said regenerative combustion burner and extending substantially parallel to said first direction and a second furnace wall surface located adjacent to said regenerative combustion burner and extending in said second direction inclined from a direction perpendicular to said first direction; and each of said plurality of said regenerative combustion burners is directed so as to be substantially tangential to said combustion chamber and has an air supply and gas exhaust surface which is located inside said circular furnace wall surface so that the burnt gas returns to said regenerative combustion burner from a rear side of said air supply and gas exhaust surface of said regenerative combustion burner.

16. An apparatus according to claim 1, wherein said combustion chamber has a longitudinal direction, and a plurality of said regenerative combustion burners are disposed in parallel with each other and are spaced from each other in said longitudinal direction of said combustion chamber.

17. An apparatus according to claim 16, wherein said longitudinal direction of said combustion chamber is directed horizontally.

18. An apparatus according to claim 16, wherein said longitudinal direction of said combustion chamber is directed vertically.

19. An apparatus according to claim 1 wherein said combustion apparatus is a crucible-type smelting furnace having a furnace wall and a crucible disposed within said furnace wall.

20. An apparatus according to claim 19, wherein said crucible is supported by said furnace wall at an upper end of said furnace wall.

21. An apparatus according to claim 19, wherein said crucible is supported by a support by said furnace wall at a bottom of said furnace wall.

* * * * *